May 13, 1958 — C. F. KRAMER — 2,834,038

WINDSHIELD WIPER ARM MECHANISM

Filed April 13, 1953

C. F. KRAMER
INVENTOR

BY E. C. McRae
J. R. Faulkner
J. H. Oster
ATTORNEYS

United States Patent Office 2,834,038
Patented May 13, 1958

2,834,038

WINDSHIELD WIPER ARM MECHANISM

Clarence F. Kramer, Birmingham, Mich., assignor to Ford Motor Company, Dearborn, Mich., a corporation of Delaware Application April 13, 1953, Serial No. 348,305

4 Claims. (Cl. 15—255)

This invention relates generally to windshield wipers for motor vehicle bodies, and has particular reference to windshield wiper mechanism for driving a windshield wiper blade in a predetermined path.

An object of the invention is to provide windshield wiper mechanism having differentially movable primary and secondary arms connected to a windshield wiper blade and controlled in such manner as to move the windshield wiper blade in a predetermined pattern in timed relation to the rotation of the arms so as to provide a maximum coverage of the windshield to be cleaned as well as to orient the windshield wiper blade in such manner as to provide more efficient wiping action in the various areas of a curved windshield. This is accomplished in the present instance by providing a primary arm mounted upon and driven by a power driven pivot shaft and a secondary arm having a driving connection with said pivot shaft and primary arm. The windshield wiper blade is connected at spaced points to the outer ends of the primary and secondary arms and the secondary arm is moved relative to the primary arm in a predetermined pattern to vary the inclination of the windshield wiper blade with respect to the primary arm as the primary arm is rotated. In one embodiment of the invention the means for effecting the differential movement between the two arms comprises a cam mounted upon the vehicle body adjacent the pivot shaft and engageable with a cam follower carried by the inner end of the secondary arm to effect radial movement of the secondary arm, the pattern of radial movement being dependent upon the formation of the cam. Thus, the angular position of the windshield wiper blade with respect to the primary arm may be predetermined for every angular position of the primary arm so that the blade traverses the surface of the windshield in such manner as to minimize the bending of the blade necessary to conform to the curvature of the windshield surface and also to enable the area of the windshield which is wiped by the blade to be increased.

Other objects and advantages of this invention will be made more apparent as this description proceeds, particularly when considered in connection with the accompanying drawings, wherein.

Figure 1:
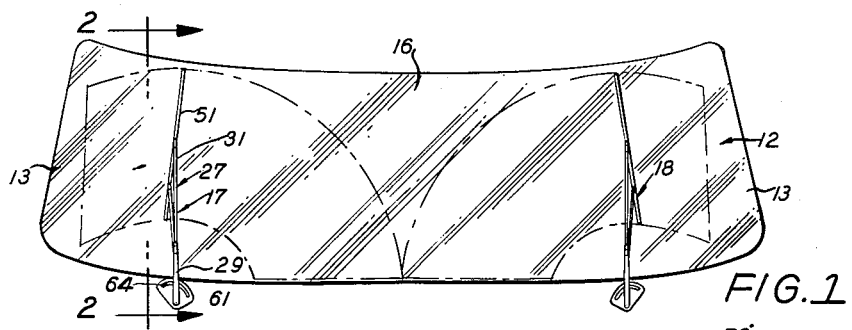
Figure 1 is a semidiagrammatical front elevational view of the windshield and windshield wiper mechanism of a motor vehicle embodying the present invention.

Referring now to the drawing, and particularly to Figure 1, the reference character 12 indicates the curved windshield of a motor vehicle body. In accordance with conventional practice, the windshield 12 has a maximum horizontal curvature in the areas 13 at the sides of the windshield, being swept rearward in this area to provide greater visibility and to blend with modern styling trends. The central area 16 of the windshield, while curved, is of more moderate curvature. The usual curved windshield, however, is curved only in one direction, horizontally, and vertical elements of the windshield both in the central portion and at the sides are substantially straight.

The vehicle body is provided with a pair of windshield wiper mechanisms 17 and 18, and since these are identical except for being reversed, only one will be described in detail. These windshield wiper mechanisms are both driven by a common power source (not shown) located beneath the vehicle cowl in the conventional manner.

Figures 2, 3, 5:
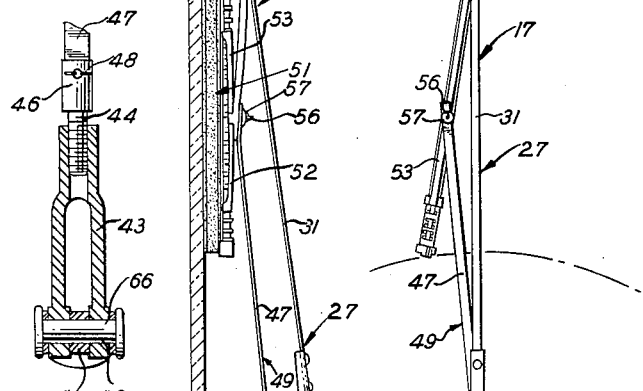
Figure 2 is an enlarged vertical cross sectional view, showing the windshield wiper mechanism in elevation, taken substantially on the plane indicated by the line 2—2 of Figure 1.
Figure 3 is an enlarged front elevational view of the windshield wiper mechanism shown in Figure 2.
Figure 5 is an enlarged cross sectional view taken on the plane indicated by the line 5—5 of Figure 2.

Referring now to Figures 2 and 3, as well as to Figure 1, the cowl 21 of the vehicle body has mounted thereon a pivot shaft support 22 rotatably supporting a pivot shaft 23. The inner end 24 of the pivot shaft extends through the cowl panel 21 for connection to the power source, while the drum head 26 at the outer end of the pivot shaft is splined or serrated.

Mounted upon the head of the pivot shaft 23 for rotation therewith is a primary arm assembly 27 comprising an arm head 28, an arm retainer 29 and an outer arm 31. The arm head 28 may be a stamping or a die casting and is provided with a socket portion 32 non-rotatably engaging the drum head 26 of the pivot shaft 23. The portion of the arm head 28 extending outwardly from the pivot shaft is generally U-shaped in cross section to form bifurcated arms 33 pivotally connected to the adjacent end portions of the side walls of the U-shaped arm retainer 29, the pivotal connection being made by means of a pin 34 whose axis extends transversely to the primary arm assembly 27 and at right angles to the axis of the pivot shaft 23. At its outer end the arm retainer 29 is riveted to the outer arm 31 which forms an extension thereof. A coil spring 36 is hooked at its outer end to the inner end of the outer arm 31 and at its opposite end engages a hook 37 connected in turn to the arm head 28. The coil spring constantly urges the arm retainer 29 and outer arm 31 of the primary arm assembly toward the windshield 12.

Figures 4, 6, 7:
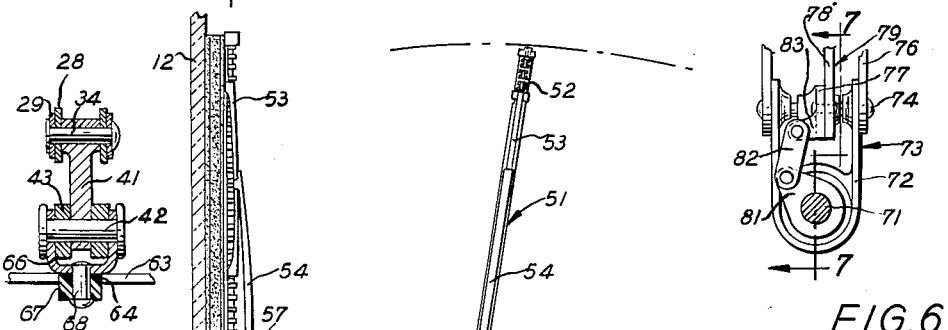
Figure 4 is an enlarged cross sectional view taken on the plane indicated by the line 4—4 of Figure 2.
Figure 6 is an enlarged fragmentary elevational view of a modification of the present invention.
Figure 7 is a cross sectional view taken on the plane indicated by the line 7—7 of Figure 6.

With reference now particularly to Figures 2, 3 and 4, it will be seen that a T-shaped link 41 is pivotally mounted upon the pin 34 interconnecting the arm head 28 and the arm retainer 29 and projects toward the windshield. The inner end of the link 41 is apertured to receive a second pin 42 serving as a pivotal connection between the link 41 and a clevis 43. The outer end of the clevis 43 is threaded to receive an adjustable connecting pin 44, and the head 46 of the adjustable pin is slotted to receive an outer arm 47, the end of the arm 47 being pivotally connected to the adjustable pin 44 by means of a cotter pin 48. The clevis 43, adjustable pin 44 and outer arm 47 comprise a secondary arm assembly 49 positioned between the primary arm assembly 27 and the windshield 12.

A windshield wiper blade 51 for engagement with the curved surface of the windshield 12 is supported at the outer ends of the outer arms 31 and 47 of the primary and secondary arm assemblies respectively. The blade 51 is generally conventional in construction and includes a flexible rubber element 52 connected by yokes 53 to a main supporting yoke 54 so as to be flexible to conform to the variable curvature of the windshield as the blade assembly is rotated. Pins 55 are carried by the supporting yoke 54 of the blade assembly and project through apertures formed in the outer ends of the primary and secondary arm assemblies so as to provide for rotation between the arm assemblies and the spaced portions of the blade assembly about axes extending generally parallel to the axis of the pivot shaft 23. Push on nuts 57 retain the blade and arms in assembled relationship.

As best seen in Figures 2 and 3, a cam plate 61 embraces the pivot shaft 23 and is clamped to the pivot shaft support 22 by means of a nut 62. The cam plate is thus fixedly mounted upon the vehicle body. The cam plate 61 has an outer flange 63 extending generally at right angles to the axis of the pivot shaft 23 and formed with a curved elongated slot 64.

Referring again to Figures 2 and 4, the pivot pin 42 interconnecting the link 41 and the clevis 43 also pivotally supports a U-shaped bracket 66 the base of which is in close proximity to the flange 63 of the cam plate 61. The bracket 66 carries a cam roller 67 rotatably mounted thereon by means of a rivet 68. The cam roller 67 projects through the curved elongated slots 64 in the cam plate 61.

It will be apparent that since the T-shaped link 41 is carried by the primary arm assembly 27, rotation of the primary arm assembly with the pivot shaft 23 effects concurrent angular movement of the link 41 and of the bracket 66 and cam roller 67 carried thereby. Due to the curvature of the elongated slot 64 in the cam plate, the cam follower 67 is moved radially with respect to the axis of the pivot shaft as the latter and the primary arm assembly 27 are rotated. The link 41, bracket 66 and cam roller 67 thus form an articulated driving connection betwen the primary arm assembly 27 and the inner end of the secondary arm assembly 69, effecting not only rotation of the secondary arm assembly with the primary arm assembly but also moving the secondary arm assembly longitudinally with respect to the primary arm assembly in timed relationship to the rotation of the windshield wiper mechanism about the axis of the pivot shaft.

It will be noted that the outer end of the outer arm 47 of the secondary arm assembly is offset with respect to the outer end of the outer arm 31 of the primary arm assembly, and consequently longitudinal movement of the secondary arm assembly by reason of the operation of the cam plate 61 and cam follower 67 results in swinging the windshield wiper blade 51 about the pivotal connection 56 between the blade and the primary arm assembly 27. Consequently, the inclination of the windshield wiper blade with respect to the primary arm assembly is variable and varies in a predetermined manner dependent upon the configuration of the elongated slot 64 in the cam plate 61.

Referring now to Figures 1 and 3, it will be seen that counterclockwise rotation of the windshield wiper arm and blade moves the cam roller 67 into a rising portion of the cam slot 64 in the cam plate 61, bodily moving the secondary arm assembly 49 radially outwardly with respect to the axis of the pivot shaft 23 and increasing the angle of inclination between the windshield wiper blade assembly 51 and the primary arm assembly 27. The successive positions of the windshield wiper blade 51 as it moves in a counterclockwise direction from the vertical position shown in Figure 1 to a position adjacent the edge of the windshield is substantially vertical. Since the vertical elements of the curved windshield 12 in this area are substantially straight, it will be apparent that the windshield wiper blade need only bend or flex slightly in order to efficiently wipe the surface of the windshield. A better cleaning job is thus obtained than with a conventional arrangement in which the blade extends diagonally across this area of the windshield, and in addition a greater area is cleaned.

The shape of the cam slot 64 in the cam plate 61 can be predetermined so as to provide the desired windshield wiper blade pattern for the particular windshield to be cleaned. In addition, the offset of the pivotal connection between the secondary arm assembly 49 and the windshield wiper blade with respect to a line joining the axis of the pivot shaft 23 and the pivotal connection 56 between the primary arm assembly and the windshield wiper blade can be varied by design to influence the pattern obtained.

Figures 6 and 7 illustrate a modification of the invention in which movement of the secondary arm assembly longitudinally of the primary arm assembly is effected by a crank and link arrangement rather than by a cam. The reference character 71 indicates the pivot shaft which supports the head 72 of a primary arm assembly 73. The pivotal connection 74 between the head 72 and the retainer 76 of the primary arm assembly also supports a pivoted link 77. Pivotally connected to the pivot link 77 at a point spaced from the pin 74 is an arm 78 of a secondary arm assembly 79.

The pivot shaft 71 has mounted thereon a crank arm 81 which in turn is pivotally connected at its outer end to a short connecting link 82. The opposite end of the connecting link 82 is pivotally connected to an integral flange 83 extending outwardly from the arm 78 of the secondary arm assembly 79. It will be apparent that rotation of the pivot shaft 71 and the primary arm assembly 73 carried thereby effects, through the crank arm and the connecting link, a predetermined radial movement of the secondary arm assembly 79 with respect to the primary arm assembly, depending upon the design of the crank and connecting link. This movement of the secondary arm assembly can be predetermined to provide a definite wiping pattern.

It will be understood that the invention is not to be limited to the exact construction shown and described, but that various changes and modifications may be made without departing from the spirit and scope of the invention, as defined in the appended claims.

What is claimed is:

1. A windshield wiper assembly for cleaning the windshield of a vehicle body, comprising a power driven pivot shaft rotatably mounted upon said body, a bracket nonrotatably mounted upon said pivot shaft for rotation therewith as a unit, a primary arm, a pin pivotally connecting said primary arm to the outer end of said bracket for pivotal movement about an axis extending transversally of said primary arm and at right angles to the axis of said pivot shaft, a windshield wiper blade pivotally connected to the outer end of said primary arm for rotation about an axis extending parallel to the axis of said pivot shaft, spring means between said bracket and said primary arm to urge said windshield wiper blade toward said windshield, a link having one end mounted upon said pin and extending toward said windshield, a secondary arm between said primary arm and said windshield of different length than primary arm, a pin pivotally connecting the inner end of said secondary arm to said link for rotation about an axis extending generally parallel to the axis of said first mentioned pin, a U-shaped support pivotally carried by said second mentioned pin, a roller mounted upon said U-shaped support for rotation about an axis extending at right angles to the axis of said second pin, a stationary cam mounted upon said vehicle body and engageable with said roller to move the latter radially with respect to said pivot shaft as the latter is rotated, and means pivotally connecting the outer end of said secondary arm to said windshield wiper blade for rotation about an axis extending generally parallel to the axis of said pivot shaft and spaced from the pivotal connection between the outer end of said primary arm and said windshield wiper blade to shift the position of said blade angularly with respect to said primary arm as the roller moves along said cam during rotation of said pivot shaft.

2. A windshield wiper assembly for cleaning the windshield of a vehicle body, comprising a power driven pivot shaft rotatably mounted upon said body, a primary arm non-rotatably mounted upon said pivot shaft for rotation therewith as a unit, a windshield wiper blade pivotally connected to the outer end of said primary arm for rotation about an axis extending parallel to the axis of said pivot shaft, spring means urging said primary arm and said windshield wiper blade toward said windshield, a link having one end pivotally connected to said primary arm at a point spaced radially from the axis of said pivot shaft, a secondary arm between said primary arm and said windshield of different length than said primary arm, a stationary cam mounted upon said vehicle body and engageable with said link to move the latter radially with respect to said pivot shaft as the latter is rotated, means connecting the inner end of said secondary arm to said link at a point spaced from the point of connection of said primary arm to said link, and means connecting the outer end of said secondary arm to said windshield wiper blade at a point spaced from the pivotal connection between the outer end of said primary arm and said windshield wiper blade to shift the position of said blade angularly with respect to said primary arm as said link moves along said stationary cam upon rotation of said pivot shaft.

3. A windshield wiper assembly for cleaning a windshield of a vehicle body, comprising a power driven shaft rotatably mounted upon said body, a primary arm mounted upon said pivot shaft for rotation therewith, a secondary arm between said primary arm and said windshield, a blade adapted to clean said windshield and having two spaced points of connection to the outer ends of said primary and said seocndary arms, a driving connection between said primary and secondary arms adjacent said pivot shaft, the inner end of said secondary arm being pivotally connected to said driving connection for rotation about a transversely extending axis such that said secondary arm extends at an acute angle to said primary arm so that the point of connection of the secondary arm to the blade is located on one side of the line joining the point of connection of the primary arm to the blade with the axis of the pivot shaft, a stationary cam mounted upon said vehicle body adjacent said driving connection and engageable with said driving connection to move said secondary arm relative to said primary arm in a direction radially of said pivot shaft to vary the angle of inclination of said blade with respect to said primary arm as said pivot shaft is rotated.

4. A windshield wiper assembly for cleaning the windshield of a vehicle body, comprising a power driven shaft rotatably mounted upon said body, a primary arm nonrotatably mounted upon said pivot shaft for rotation therewith as a unit, a windshield wiper blade having its central portion connected to the outer end of said primary arm, a stationary cam mounted upon said vehicle body and located between said primary arm and said body, a member pivotally connected at one end to said primary arm and at its opposite end engageable with said stationary cam for radial movement with respect to the axis of said pivot shaft as said pivot shaft and said primary arm are rotated, a secondary arm located between primary arm and said windshield and connected at its inner end to an intermediate portion of said member, and means connecting the outer end of said secondary arm to said windshield wiper blade at a point located between the inner end of said blade and the point of connection of said primary arm to said blade, said member comprises a link pivotally connected to the primary arm adjacent said pivot shaft for rotation about an axis extending transversely to said primary arm, antifriction means at the opposite end of said link engageable with said stationary cam, and means pivotally connecting the inner end of said secondary arm to an intermediate portion of said link for rotation about an axis extending transversely of said secondary arm and parallel to the pivotal axis between said link and said primary arm.

References Cited in the file of this patent

UNITED STATES PATENTS

| 2,030,286 | Evans | Feb. 11, 1936 |
| 2,079,399 | Drew | May 4, 1937 |
| 2,324,894 | Whitted | July 20, 1943 |
| 2,356,424 | Paton | Aug. 22, 1944 |
| 2,629,891 | Greene | Mar. 3, 1953 |

FOREIGN PATENTS

| 827,531 | France | Jan. 28, 1938 |